United States Patent
Sia et al.

(10) Patent No.: US 8,065,689 B2
(45) Date of Patent: Nov. 22, 2011

(54) RELEASE-DEPENDANT FILENAMES FOR DEVICE DRIVERS

(75) Inventors: Barry Sia, Concord, CA (US); Seung Wan Lim, Dublin, CA (US); Yuichi Komori, Pleasant Hill, CA (US)

(73) Assignees: Kyocera Mita Corporation, Osaka (JP); Kyocera Technology Development, Inc., Concord, CA (US)

( * ) Notice: Subject to any disclaimer, the term of this patent is extended or adjusted under 35 U.S.C. 154(b) by 1697 days.

(21) Appl. No.: 11/052,494

(22) Filed: Feb. 3, 2005

(65) Prior Publication Data

US 2006/0173937 A1    Aug. 3, 2006

(51) Int. Cl.
G06F 9/44    (2006.01)
(52) U.S. Cl. ........................ 719/327; 719/321
(58) Field of Classification Search .................. 719/310, 719/320, 327, 321; 713/1
See application file for complete search history.

(56) References Cited

U.S. PATENT DOCUMENTS

| | | | | |
|---|---|---|---|---|
| 5,339,432 | A * | 8/1994 | Crick ................. | 713/1 |
| 5,715,463 | A * | 2/1998 | Merkin ............... | 717/175 |
| 5,991,774 | A | 11/1999 | Tate | |
| 6,085,156 | A * | 7/2000 | Rust et al. ........... | 702/91 |
| 6,208,429 | B1 * | 3/2001 | Anderson ............ | 358/1.18 |
| 6,223,134 | B1 * | 4/2001 | Rust et al. ........... | 702/121 |
| 6,272,678 | B1 | 8/2001 | Imachi | |
| 6,360,366 | B1 | 3/2002 | Heath | |
| 6,385,768 | B1 | 5/2002 | Ziebell | |
| 6,389,592 | B1 | 5/2002 | Ayres | |
| 6,585,779 | B1 | 7/2003 | Becker | |
| 6,681,382 | B1 | 1/2004 | Kakumani | |
| 6,757,893 | B1 | 6/2004 | Haikin | |
| 6,766,334 | B1 | 7/2004 | Kaler | |
| 6,826,750 | B1 | 11/2004 | Curtis | |
| 6,833,867 | B1 * | 12/2004 | Anderson .............. | 348/231.9 |
| 6,836,859 | B2 | 12/2004 | Berg | |
| 7,069,365 | B2 * | 6/2006 | Zatorski ............... | 710/200 |
| 7,213,060 | B2 * | 5/2007 | Kemp et al. ........... | 709/222 |
| 7,293,272 | B1 * | 11/2007 | Okcu et al. ............ | 719/327 |
| 7,334,227 | B2 * | 2/2008 | Kim et al. ............. | 717/178 |
| 2002/0138564 | A1 * | 9/2002 | Treptow et al. ........ | 709/203 |
| 2003/0028519 | A1 | 2/2003 | Burgess | |
| 2003/0182320 | A1 | 9/2003 | Lai | |
| 2003/0182652 | A1 | 9/2003 | Custodio | |
| 2003/0200291 | A1 * | 10/2003 | Kemp et al. ........... | 709/222 |
| 2004/0093491 | A1 * | 5/2004 | Ebata .................... | 713/100 |
| 2004/0252340 | A1 * | 12/2004 | Komagamine et al. ... | 358/1.18 |
| 2005/0039193 | A1 * | 2/2005 | Choi et al. ............. | 719/321 |
| 2006/0132835 | A1 * | 6/2006 | Nagaraja .............. | 358/1.15 |

FOREIGN PATENT DOCUMENTS

| | | |
|---|---|---|
| JP | 6083606 | 3/1994 |
| JP | 2003058378 | 2/2003 |

* cited by examiner

*Primary Examiner* — Van Nguyen

(57) ABSTRACT

A method for providing release-dependant filenames for a device driver, by providing Config information and a table of the driver's component files; assigning unique, release-dependant filenames for the component files; and producing the device driver containing the release-dependant filenames. Scripts and a preprocessor are used to convert filenames and template filename references into actual names. Name conversion comprises converting by a preprocessor for compiled files and converting by scripts for other files. Unique names of files enable simultaneous operation of two versions of a device driver. Methods include encoding module name, version numbers, date, language, and OEM information into the filename; one alphanumeric-character version number and two-character language code; configuration file and automatic generation of Config information; printing device driver with major and minor version numbers; and date encoding for files that are updated more frequently than version updates.

16 Claims, 6 Drawing Sheets

| 310 | Update Config information and encoded information, automatically generated by conversion system |

| 320 | Retrieve Code |

| 330 | Modify the Build files (make files, project files (.dsp), etc.) comprising<br>1. Update Executable Filenames (.DLLs, .EXEs)<br>2. Update Data Filenames (.DAT, .MDX, .CHM)<br>3. Update Version Number references<br>4. Update Modnames.h |

| 340 | Build Executable Files, comprising<br>a. Build .DLLs and .EXE files with the updated file names<br>b. Copy newly-built files into destination Installation directory |

| 350 | Modify the Installation Files (.inf files)<br>1. Update Executable Filenames (.DLLs, .EXEs)<br>2. Update Data Filename references (.DAT, .MDX, .CHM)<br>3. Update Version Number References<br>4. Copy installation files into destination Installation directory |

FIG. 3

ModNames.h

```
#define RDF_TAG      "0205"

#define W9XMain_FILE_NAME  "Pd9x"RDF_TAG".exe"
#define ABMain_FILE_NAME   "PdAB"RDF_TAG".dll"
#define AB3DX_FILE_NAME    "PdA3"RDF_TAG".dll"
#define XpCore_FILE_NAME   "PdXp"RDF_TAG".dll"
.
.
```

DriverModuleMgr.cpp

```
#include "ModNames.h"
.
.
if (stricmp(regEntry.szCoreFileName,
              ABMain_FILE_NAME) == 0)
.
.
```

FIG. 4

Filename encoding format

Pd[module][version][optional codes].[ext]

where

Pd = identification tag

[module]    =   module identifier

[version]   =   version number
                (major version + minor version)

One alphanumeric character in range: 0-9, A-Z, a-z
            for each of Major & minor versions
    "3A" means Version 3.10

[ext]       =   filename extension

[optional codes] comprises:

[date]      =   date (month, day, year, etc.)
                (for files updated more frequently
                    than version updates)

[language]  =   language code
                EN=English, JP=Japanese, FR=French, ...

[oem]       =   OEM code etc.

FIG. 5

RELEASE-DEPENDANT FILENAMES FOR DEVICE DRIVERS

CROSS-REFERENCES TO RELATED APPLICATIONS

Not Applicable

FEDERALLY SPONSORED RESEARCH

Not Applicable

SEQUENCE LISTING OR PROGRAM

Not Applicable

FIELD OF TH INVENTION

This invention relates to device drivers, and more particularly to an improved method of providing release-dependant filenames for device drivers.

BACKGROUND OF THE INVENTION

Device drivers are generally known, including a printer driver. Typically, printing from a computer occurs through the use of a printer driver. Upon either an application launch or during a print command load time, the application will call an instance of the printer driver. During a printer driver upgrade and installation process, there can be problems associated with filename access conflicts and lockup. There is a need for a method of assigning filenames for device drivers in a uniform, conflict-free manner. The present invention arose out of the above concerns associated with providing an improved method of providing release-dependant filenames for device drivers.

SUMMARY OF THE INVENTION

Methods, computer program products, computing and printing systems for providing release-dependant filenames for device drivers. A method for providing release-dependant filenames for a device driver, by providing Config information and a table of the driver's component files; assigning unique, release-dependant filenames for the component files; and producing the device driver containing the release-dependant filenames. Scripts and a preprocessor are used to convert filenames and template filename references into actual names. Name conversion comprises converting by a preprocessor for compiled files and converting by scripts for other files. Unique names of files enable simultaneous operation of two versions of a device driver. Methods include encoding module name, version numbers, date, language, and OEM information into the filename; one alphanumeric-character version number and two-character language code; configuration file and automatic generation of Config information; printing device driver with major and minor version numbers; and date encoding for files that are updated more frequently than version updates.

The invention will be more fully understood upon consideration of the detailed description below, taken together with the accompanying drawings.

DESCRIPTION OF THE DRAWINGS

FIG. 3 is a flowchart showing more detailed steps in producing a device driver comprising unique, release-dependant filenames, in accordance with a preferred embodiment of the present invention.

FIG. 4 includes sample code sections of Modnames.h and DriverModuleMgr.cpp, in accordance with a preferred embodiment of the present invention.

FIG. 5 is a view of the encoding of module name, version number, and other information in a filename, in accordance with a preferred embodiment of the present invention.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
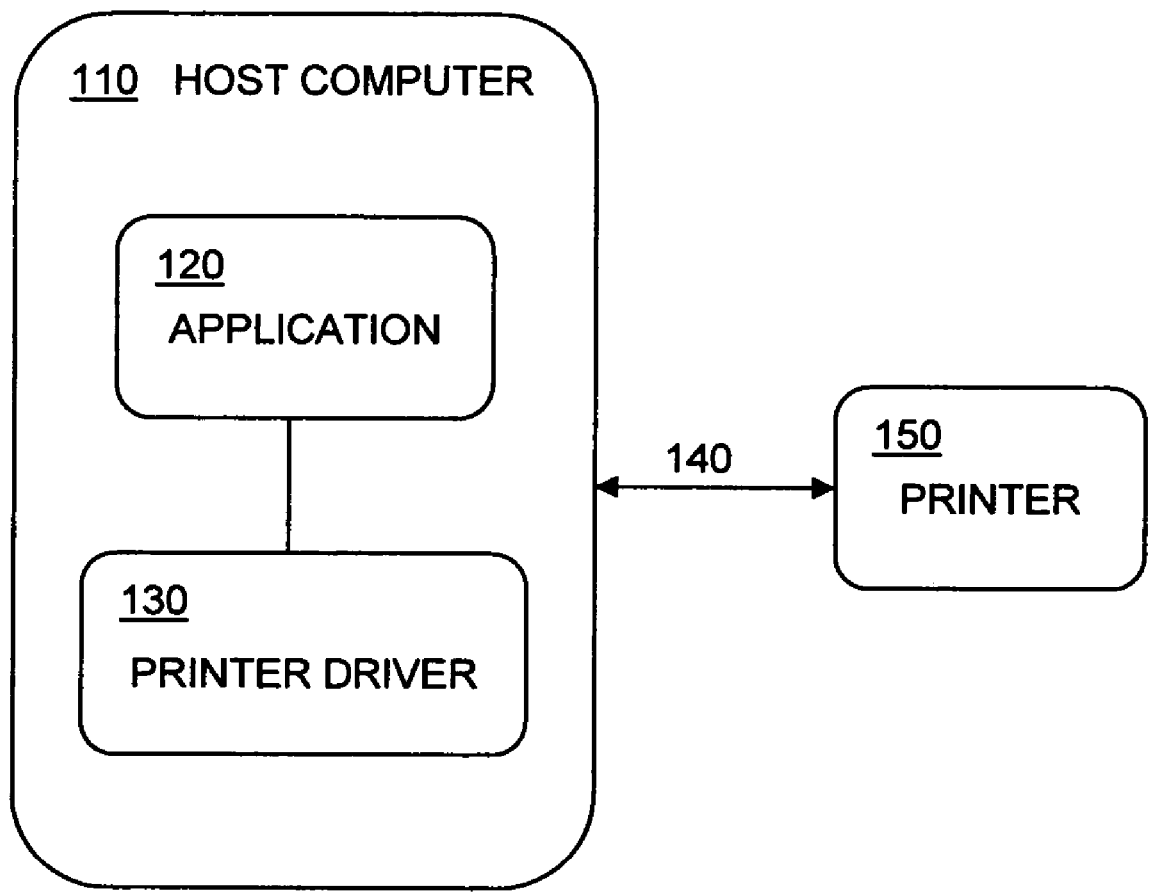
FIG. 1 is a simplified block diagram showing connection of a computing system to a printer.

FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer driver settings, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver settings, but they are to be understood as similarly applicable to other kinds of device drivers.

Figure 2:
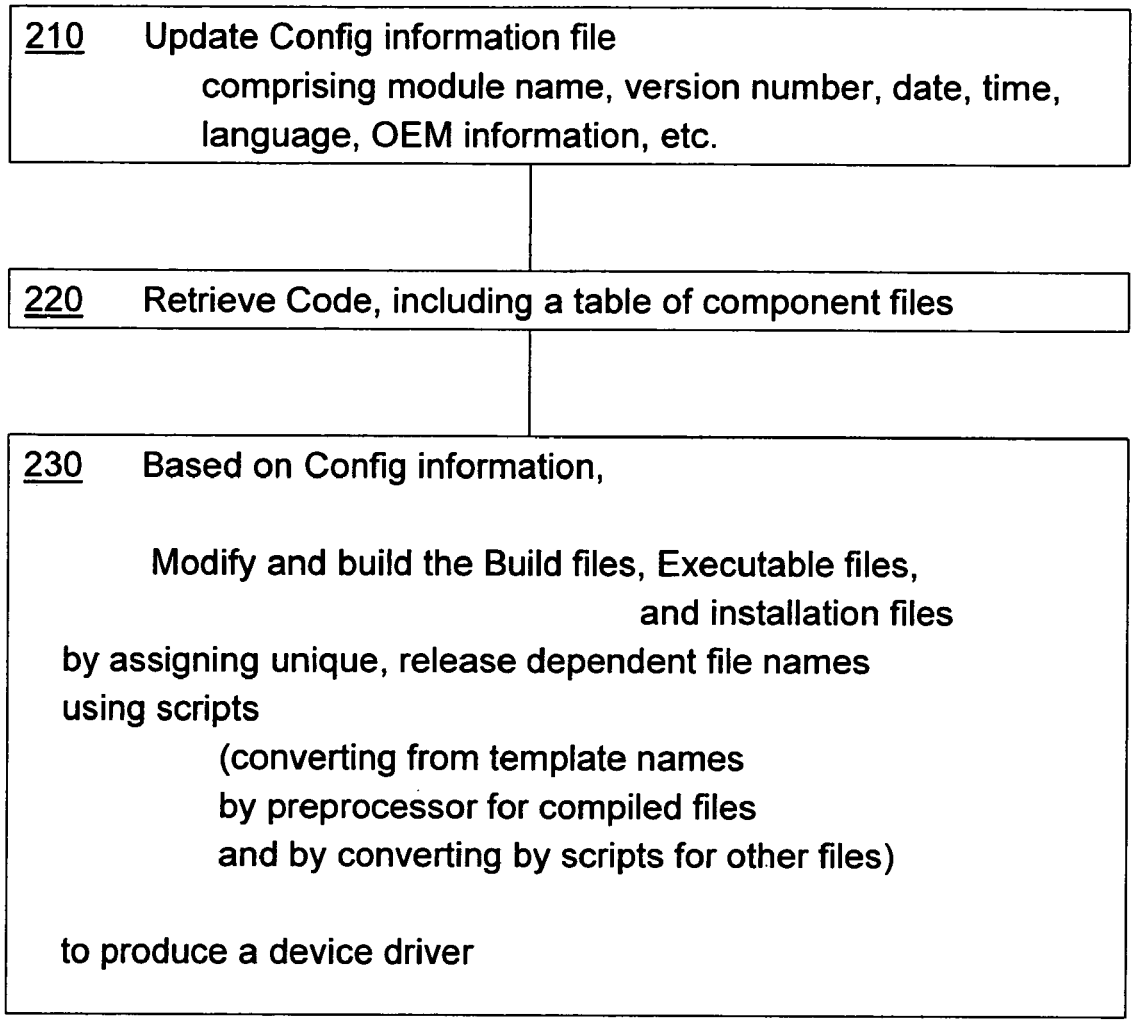
FIG. 2 is a flowchart showing the basic steps in producing a device driver comprising unique, release-dependant filenames, in accordance with a preferred embodiment of the present invention.

FIG. 2 is a flowchart showing the basic steps in producing a device driver comprising unique, release-dependant filenames, in accordance with a preferred embodiment of the present invention.

In step 210, the Config (Configuration) information file is updated. In one embodiment of the present invention, this is a text file containing such information as the module name, version number, date, time, language, OEM information, etc. which are supplied by a user. The module name indicates a broad classification of the device driver and comprises such information as the model type, operating system type, etc. The version number indicates the version of the device driver being produced and may comprise major and minor version numbers as described below. The date and time may be converted from a longer format in the Config file to a more compact encoded format as described below. The language indicates the language for which the device driver being produced is localized for. The OEM information indicates the particular customer for which the device driver is customized for, such as for OEM (original equipment manufacturing). The Config file may contain other similar information.

In step 220, code is retrieved, including a table of component files. The table of component files lists all the source files making up the device driver for which the name-conversion and information-encoding of the present invention are to be performed. The table of component files is hereinafter named "Modnames.h". Typically code making up the source files for the device driver being produced is retrieved from Microsoft Visual SourceSafe and similar tools for source code maintenance and management. The printer driver is composed of one or more executable files (.DLL and .EXE files) and one or more support files (herein referred to as data files) containing various information relevant to the specific model of the printer. Among other things, these data files may also include language-specific help files, and various GUI-related information. There may be a huge number of executable and data files that need to be managed.

In step 230, a device driver is produced by modifying and building the Build files, Executable files, and installation files, and through assigning of unique, release-dependant names for the component files. A Build file is a file that is needed by the compiler and linker for generating an executable. In a preferred embodiment of the present invention, Build files comprises: 1. Microsoft Visual Studio Project Files (*.dsp); 2. Export definition files (*.def); and 3. Resource files (*.rc). In a preferred embodiment of the present invention, the assigning of the unique, release-dependant names for the component files comprises converting from template names using automated script programs, wherein converting of names for compiled files is done by a preprocessor and converting of names for other files is done by scripts. Compiled files are files that are subject to compile-and-link process of the language compiler. More details of modifying, building, and assigning mechanisms are described below.

FIG. 3 is a flowchart showing more detailed steps in producing a device driver comprising unique, release-dependant filenames, in accordance with a preferred embodiment of the present invention.

In step 310, the Config (Configuration) information is updated. In a preferred embodiment of the present invention, the Config information is a text file containing such information as the module name, version number, date, time, language, OEM information, etc. which are supplied by a user. In another embodiment of the present invention, the version number, date, time, and other information are automatically generated by a conversion system. For example, date and time can be obtained from the operating system, and the version number can be generated by taking the version number from the previous production of the driver and incrementing the version number. Date and time can be encoded by condensing it into a more compact format, similarly to the encoding of version numbers and language code, described below. If required, a unique string for encoded information can be obtained from the process id or by random number generation.

In step 320, code is retrieved, including a table of component files. The table of component files lists all the source files making up the device driver for which the name-conversion and information-encoding of the present invention are to be performed. The table of component files is hereinafter named "Modnames.h". This step is identical to the step 220 described earlier.

In step 330, Build files (make files, project files (.dsp), etc.) are modified. This step comprises the following sub-steps. First, filenames of the Executable files (.DLLs, .EXEs) are composed and updated using the script and the source data file. File names are composed with their distinct initials, version number, and date in a RDF (release-dependant filename) manner of the present invention. Second, the data file names in the designated data file source directories are changed using the RDF names. This step renames actual data files. The script finds the data files listed in order and renames filenames. Third, version number references are updated. The software product displays its version and creation date. There are modules that display the version number and creation date. The RDF script searches (text search) for those modules to update the version number and creation date. Fourth, the module filenames header file, Modnames.h, is updated. The header file stores RDF related information. It serves as a look up directory for the information that changes according to the RDF spec.

In step 340, the executable files are compiled and linked. This step includes building the .DLL and .EXE files with the updated filenames and RDF information. The newly built files are copied into the destination installation directories that are specified in the RDF source data file. Automated copying improves the accuracy and reduces inaccuracy in the manual copying process.

In step 350, software/driver installation instruction files (.inf) are updated. Typically in a release, package, or CD of a driver, there is one .inf file for each version of operating system. For example, one for Windows NT, one for Windows 9x, one for Windows XP, etc. The instruction files need to be updated to know the name of executable file names, system and data filenames, software version number, and the creation date. Once the software/driver installation instruction files (.inf) get updated with RDF information, the files are copied into the destination installation directories to complete the software installation package.

FIG. 4 includes sample code sections of Modnames.h and DriverModuleMgr.cpp, in accordance with a preferred embodiment of the present invention. Modnames.h is a typical name for a file containing a table of component files, which lists all the source files making up the device driver for which the name-conversion and information-encoding of the present invention are to be performed. DriverModuleMgr.cpp is a sample file in which a component file may be referenced.

The first line in the file defines RDF_TAG as "0205" which is the version number. Typically this version number is the result of the modification by the script file, which updated it from the previous "0204" based on the Config information. The subsequent lines define the template names. The second line [#define W9XMain_FILE_NAME "Pd9x"RDF_TAG".exe"] defines the template name W9XMain_FILE_NAME as "Pd9x"RDF_TAG".exe". Here, Pd is the identification tag for a printer driver. 9x is the module ID. RDF_TAG is the label defined in the first line, followed by the extension ".exe". More details of the various components of a file name format is given later.

When the C preprocessor processes these files, the embedded RDF_TAG in the template name is replaced by embedded "0205" in the template name. In a preferred embodiment of the present invention, the assigning of the unique, release-dependant names for the component files comprises converting from template names using automated script programs, wherein converting of names for compiled files is done by a preprocessor and converting of names for other files is done by scripts. Compiled files are files that are subject to compile-and-link process of the language compiler.

DriverModuleMgr.cpp is a sample file in which a component file may be referenced. The first line specifies that the definitions made in the "ModNames.h" file are to be included. When a reference to a component file of a device driver is made, a template name, instead of the actual file name, as in the line "if (stricmp(regEntry.szCoreFileName, ABMain_FILE_NAME)=0)" in this sample. In an embodiment of the present invention, the template names are replaced by the C preprocessor according to the definitions in the ModNames.h file. Other comparable methods can be used in place of the C preprocessor, such as a special-purpose custom preprocessor.

FIG. 5 is a view of the encoding of module name, version number, and other information in a filename, in accordance with a preferred embodiment of the present invention. Format of template names and filenames is "Pd[module][version][optional codes].[ext]" where the components are defined as follows. Pd is the identification tag. [module] is the module identifier, which is typically a fixed-length identifier such as 9x, Fs, 3d, NC, etc. [version] is the version number, which may be a single number or a combination of a major version number and a minor version number. In a preferred embodiment of the present invention, a version number is one alphanumeric character in the range 0-9, A-Z, a-z, etc. for each of major and minor versions. For example, "3A" may be an encoding for Version 3.10. [ext] is the filename extension, such as .exe, .dll, .dsp, .rc, .inf, etc.

[optional codes] comprises the following. [date] is the date (month, day, year, etc.), which is useful when the file is updated more frequently than the versions are updated. The date and time may be converted from a longer format in the Config file to a more compact encoded format.

[language] is the language code. The language indicates the language for which the device driver being produced is localized for. In a preferred embodiment of the present invention, the language code information is encoded in two-character language code. For exmple, EN for English, JP for Japanese, FR for French, etc.

[oem] is the OEM code. The OEM information indicates the particular customer for which the device driver is customized for, such as for OEM (original equipment manufacturing). Other kinds of similar information can be similarly encoded into the filename.

Figure 6:
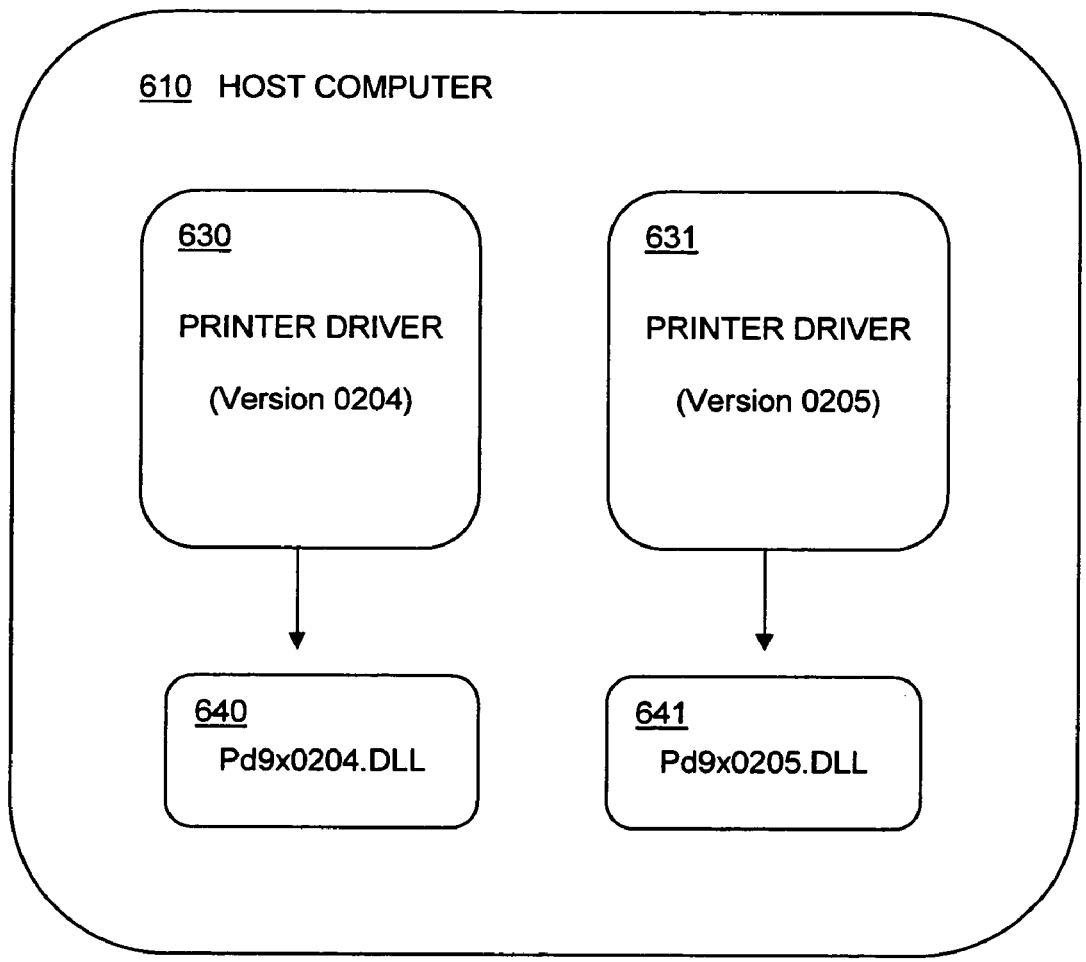
FIG. 6 is a block diagram of an exemplary computing system in which release-dependant filenames enables coexistence of two versions of a printer driver, in accordance with a preferred embodiment of the present invention.

FIG. 6 is a block diagram of an exemplary computing system in which release-dependant filenames enables coexistence of two versions of a printer driver, in accordance with a preferred embodiment of the present invention. Within the host computer 610 are two versions of a printer driver: the Version 0204 printer driver 630 and the Version 0205 printer driver 631, which may be in the process of being installed.

During a printer driver upgrade and installation process, some of the core DLL and other system files may get locked up by the operating system and can not be overwritten by the installation process. When such a lockup occurs, there is no notification to the system users and it looks like the installation process was completed successfully. But there can be remaining old files locked up by the OS system, causing serious problems. One possible problem is that different versions of DLL files may get mixed up, which may lead to a system crash. Another possible problem is that old system model information files for the printer driver may remain without being overwritten, in which case, the upgrade is not successful because the system information is obsolete, which also may lead to a system crash. If both versions of the printer driver 630, 631 referenced the same file, there could be access conflicts.

Rather than renaming files in an ad-hoc manner upon detecting a filename reference conflict, assigning release-dependant names uniformly according to the present invention avoids such problems. The two versions of the DLL file 640, 641 have the version numbers 0204 and 0205 encoded in their respective filenames, and each of the two versions of the printer driver 630, 631 references the DLL file corresponding to its version, thus solving access conflict and system lockup problems.

Furthermore, the builder, who may need to manage literally hundreds of files, may also need to build releases as often as daily. As can be imagined, changing that many files on a daily basis certainly results in a higher cost in terms of time, especially since it exposes the builder to an unnecessary amount of risk in the form of human error. With the present invention, the complexity and tedium of the error-prone method of having to manually change each file name and each file name reference throughout all of the files in the file system will be minimized if not completely eliminated.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although this invention has been largely described using Windows terminology, one skilled in this art could see how the disclosed methods can be used with other operating systems, such as DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for generating a device driver, comprising:
providing Config information and a table of component files for the device driver;
assigning unique, release-dependant file names for the component files of the device driver based on the Config information, by encoding at least one item within the Config information into a portion of name of each file of the component files, so that the component files of the device driver of a release have names that are different from the corresponding component files of the device driver of any other release;
producing a first device driver containing the unique, release-dependant file names; and
producing a second device driver, wherein the unique, release-dependant names of the component files of the first device driver and the second device driver enable simultaneous operation of the first device driver and the second device driver, wherein the second device driver is a new version of the first device driver, and wherein simultaneous operation of the two device drivers is achieved by the first device driver accessing its component files with unique, release-dependant names, and the second device driver accessing its component files with unique, release-dependant names, which names are different from the corresponding names of the first device driver.

2. The method of claim 1, wherein the assigning of the unique, release-dependant names for the component files comprises converting from template names using scripts.

3. The method of claim 2, wherein converting from template names using scripts comprises converting by a preprocessor for compiled files and converting by scripts for other files.

4. The method of claim 1, wherein the unique, release-dependant names of the component files of the device driver comprises encoded information selected from the group consisting of module name, version number, date, language information, OEM (original equipment manufacturing) information, and any combination of these items.

5. The method of claim 4, wherein the version number is encoded in one alphanumeric character and the language information is encoded in two-character language code.

6. The method of claim 4, wherein the encoded information is supplied in a configuration file.

7. The method of claim 4, wherein the encoded information is automatically generated by a conversion system.

8. The method of claim 4, wherein the device driver is a printing device driver; the version number comprises a major version number and a minor version number; and the unique, release-dependant names of the component files of the device driver comprises encoded date for the component files that are updated more frequently than version updates.

9. A computer program product in a non-transitory computer-readable storage medium for generating a device driver relating to an operation of a printing, image forming, and computing apparatus, comprising machine-readable code for causing a machine to perform the method steps of:
providing Config information and a table of component files for the device driver;
assigning unique, release-dependant file names for the component files of the device driver based on the Config information, by encoding at least one item within the Config information into a portion of name of each file of the component files, so that the component files of the device driver of a release have names that are different from the corresponding component files of the device driver of any other release;
producing a first device driver containing the unique, release-dependant file names; and
producing a second device driver, wherein the unique, release-dependant names of the component files of the first device driver and the second device driver enable simultaneous operation of the first device driver and the second device driver, wherein the second device driver is a new version of the first device driver, and wherein simultaneous operation of the two device drivers is achieved by the first device driver accessing its component files with unique, release-dependant names, and the second device driver accessing its component files with unique, release-dependant names, which names are different from the corresponding names of the first device driver.

10. The computer program product of claim 9, wherein the assigning of the unique, release-dependant names for the component files comprises converting from template names by a preprocessor for compiled files and converting by scripts for other files.

11. The computer program product of claim 9, wherein the unique, release-dependant names of the component files of the device driver comprises encoded information selected from the group consisting of module name, version number, date, language information, OEM (original equipment manufacturing) information, and any combination of these items, and wherein the version number is encoded in one alphanumeric character and the language information is encoded in two-character language code.

12. The computer program product of claim 11, wherein the device driver is a printing device driver; the version number comprises a major version number and a minor version number; the unique, release-dependant names of the component files of the device driver comprises encoded date for the component files that are updated more frequently than version updates; and the encoded information is automatically generated by a conversion system.

13. A computing system including a microprocessor for generating a device driver relating to an operation of a printing, image forming, and computing apparatus, comprising:
providing Config information and a table of component files for the device driver;
assigning unique, release-dependant file names for the component files of the device driver based on the Config information, by encoding at least one item within the Config information into a portion of name of each file of the component files, so that the component files of the device driver of a release have names that are different from the corresponding component files of the device driver of any other release;

producing a first device driver containing the unique, release-dependant file names; and producing a second device driver, wherein the unique, release-dependant names of the component files of the first device driver and the second device driver enable simultaneous operation of the first device driver and the second device driver, wherein the second device driver is a new version of the first device driver, and wherein simultaneous operation of the two device drivers is achieved by the first device driver accessing its component files with unique, release-dependant names, and the second device driver accessing its component files with unique, release-dependant names, which names are different from the corresponding names of the first device driver.

14. The computing system of claim 13, wherein the assigning of the unique, release-dependant names for the component files comprises converting from template names by a preprocessor for compiled files and converting by scripts for other files.

15. The computing system of claim 13, wherein the unique, release-dependant names of the component files of the device driver comprises encoded information selected from the group consisting of module name, version number, date, language information, OEM (original equipment manufacturing) information, and any combination of these items, and wherein the version number is encoded in one alphanumeric character and the language information is encoded in two-character language code.

16. The computing system of claim 15, further comprising a print engine, wherein the device driver is a printing device driver; the version number comprises a major version number and a minor version number; the unique, release-dependant names of the component files of the device driver comprises encoded date for the component files that are updated more frequently than version updates; and the encoded information is automatically generated by a conversion system.

* * * * *